U S 010589839B2

(12) United States Patent
Schlipf et al.

(10) Patent No.: US 10,589,839 B2
(45) Date of Patent: Mar. 17, 2020

(54) WING FOR AN AIRCRAFT

(71) Applicant: Airbus Operations GmbH, Hamburg (DE)

(72) Inventors: Bernhard Schlipf, Hamburg (DE); Florian Lorenz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 341 days.

(21) Appl. No.: 15/852,099

(22) Filed: Dec. 22, 2017

(65) Prior Publication Data
US 2018/0178901 A1   Jun. 28, 2018

(30) Foreign Application Priority Data

Dec. 22, 2016  (EP) .................................... 16206508

(51) Int. Cl.
*B64C 9/24* (2006.01)
*B64C 13/28* (2006.01)
*B64C 9/22* (2006.01)
*B64C 13/30* (2006.01)
*B64C 13/34* (2006.01)

(52) U.S. Cl.
CPC .................. *B64C 9/24* (2013.01); *B64C 9/22* (2013.01); *B64C 13/30* (2013.01); *B64C 13/341* (2018.01); *B64C 13/34* (2013.01)

(58) Field of Classification Search
CPC ........... B64C 9/24; B64C 9/22; B64C 13/341; B64C 13/30
See application file for complete search history.

(56) References Cited

U.S. PATENT DOCUMENTS

| 1,780,838 A | 11/1930 | Page |
| 3,743,219 A * | 7/1973 | Gorges ..................... B64C 9/24 244/210 |

(Continued)

FOREIGN PATENT DOCUMENTS

| EP | 2272752 | 1/2011 |
| EP | 2998217 | 3/2016 |

(Continued)

OTHER PUBLICATIONS

European Search Report, dated May 17, 2017, priority document.

*Primary Examiner* — Brian M O'Hara
*Assistant Examiner* — Keith L Dixon
(74) *Attorney, Agent, or Firm* — Greer, Burns & Crain, Ltd.

(57) ABSTRACT

A wing for an aircraft, comprising a main wing, a slat, and a connection assembly for movably connecting the slat to the main wing. The connection assembly comprises first and second link elements. The first link element has a first link end rotatably mounted to the slat via a first joint, and a second link end rotatably mounted to the main wing via a second joint. The second link element has a first element end rotatably mounted to the slat via a third joint, and a second element end rotatably mounted to the main wing via a fourth joint. The first joint, the second joint and the third joint are formed as spherical joints or as universal joints, while the fourth joint is formed as a hinged joint, wherein the hinge axis is inclined between a wing thickness direction and a wing span direction.

17 Claims, 8 Drawing Sheets

(56) References Cited

U.S. PATENT DOCUMENTS

| | | | | |
|---|---|---|---|---|
| 4,172,575 A * | 10/1979 | Cole | ................ | B64C 9/04 244/216 |
| 4,202,519 A * | 5/1980 | Fletcher | ................ | B64C 9/24 244/210 |
| 4,650,140 A * | 3/1987 | Cole | ................ | B64C 9/24 244/214 |
| 5,651,513 A | 7/1997 | Arena | | |
| 5,823,471 A * | 10/1998 | Dazet | ................ | B64C 9/10 244/99.3 |
| 5,836,550 A * | 11/1998 | Paez | ................ | B64C 9/22 244/214 |
| 2002/0047068 A1 * | 4/2002 | Uchida | ................ | B64C 3/50 244/99.3 |
| 2005/0116115 A1 | 6/2005 | Perez-Sanchez | | |
| 2009/0134281 A1 | 5/2009 | Engelbrecht et al. | | |
| 2010/0116928 A1 * | 5/2010 | Cerne | ................ | B64C 9/16 244/87 |
| 2010/0155542 A1 | 6/2010 | Heller | | |
| 2010/0187368 A1 * | 7/2010 | Cathelain | ................ | B64C 9/24 244/214 |
| 2011/0006155 A1 | 1/2011 | Kracke | | |
| 2011/0253832 A1 * | 10/2011 | Wildman | ................ | B64C 9/02 244/99.13 |
| 2012/0211604 A1 | 8/2012 | Schlipf et al. | | |
| 2012/0224964 A1 * | 9/2012 | Clark | ................ | B64C 9/02 416/23 |
| 2014/0042276 A1 * | 2/2014 | Parker | ................ | B64C 9/02 244/214 |
| 2014/0138481 A1 * | 5/2014 | Sakota | ................ | B64C 9/22 244/99.3 |
| 2014/0158822 A1 * | 6/2014 | Langley | ................ | B64C 9/02 244/99.3 |
| 2014/0246540 A1 | 9/2014 | Schlipf et al. | | |
| 2016/0083082 A1 * | 3/2016 | Bishop | ................ | B64C 9/02 244/213 |

FOREIGN PATENT DOCUMENTS

| | | | | |
|---|---|---|---|---|
| GB | 470923 A * | 8/1937 | ................ | B64C 9/24 |
| WO | 2008135266 | 11/2008 | | |
| WO | WO-2011020593 A2 * | 2/2011 | ................ | B64C 9/22 |

\* cited by examiner

WING FOR AN AIRCRAFT

CROSS-REFERENCES TO RELATED APPLICATIONS

This application claims the benefit of the European patent application No. 16206508.0 filed on Dec. 22, 2016, the entire disclosures of which are incorporated herein by way of reference.

BACKGROUND OF THE INVENTION

The present invention relates to a wing for an aircraft. The wing comprises a main wing, a slat and a connection assembly for movably connecting the slat to the main wing, such that the slat can be moved between a retracted position, for cruise flight, and at least one extended position, preferably two or more extended positions, for take-off and landing.

The connection assembly comprises an elongate, preferably rod-shaped, first link element and a second link element. The first link element has a first link end and an opposite second link end. The first link end is rotatably, in particular pivotably, mounted to the slat via a first joint. The second link end is rotatably, in particular pivotably, mounted to the main wing via a second joint. The second link element has a first element end and an opposite second element end. The first element end is rotatably, in particular pivotably, mounted to the slat via a third joint that is spaced apart from the first joint. The second element end is rotatably, in particular pivotably, mounted to the main wing via a fourth joint that is spaced apart from the second joint.

There are wings known in the art employing a slat track to movably mount the slat to the main wing. The slat is usually connected to one end of the slat track in a fixed manner, while the slat track is mounted to the main wing in such a way that it is movable in a direction along the longitudinal axis of the slat track. In such a way, the movement of the slat is defined alone by the movement of the slat track along a predetermined path in the direction of its longitudinal axis. Such a slat track and the corresponding movement path of the slat track require considerable room in the leading edge portion of the main wing, so that a front spar of the main wing usually has to be penetrated by the slat track when the slat track is in the retracted position, which in turn requires a complex construction.

Alternative wings are known in the art which do not employ a slat track, but instead employ a linkage kinematics. From U.S. Pat. No. 1,780,838 and from WO2008/135266A1 a four bar linkage is known, wherein two link elements are coupled to the slat with their first ends and are coupled to the main wing with their opposite second ends. Both link elements are coupled to the slat and to the main wing in a way spaced apart from one another and rotatable about axes of rotation that extend in the wing span direction. Such an arrangement requires the link elements, the joints and the actuators to be formed with high strength in order to resist the air-loads on the slat. From U.S. Pat. No. 1,780,838 it is also known that the axes of rotation of the four bar linkage might extend in the wing thickness direction instead of in the wing span direction. In such a way, the slat carries out a lateral movement but no curved movement along the curvature of the wing profile.

SUMMARY OF THE INVENTION

Accordingly, an object of the present invention is to provide a wing for an aircraft including a connection assembly that is optimized for a minimum space, a minimum weight and an aerodynamically advantageous path.

This object is achieved in that the first joint and the second joint are formed as spherical joints or as universal joints, allowing rotation, in particular pivoting, about more than one axes of rotation, in particular about two perpendicular axes of rotation. A spherical joint is generally torque-free, i.e. transfers no torque, while a universal joint is capable of transferring torque. Further, one of the third joint and the fourth joint is formed as a spherical joint or as a universal joint allowing rotation, in particular pivoting, about more than one axes of rotation, in particular about two perpendicular axes of rotation. The other of the third joint and the fourth joint is formed as a hinged joint allowing rotation, in particular pivoting, only about a single hinge axis. In such a way, the connection assembly is formed as a master and slave assembly, where the first link element forms a slave element unable to transfer loads in the wing span direction, while the second link element forms a master element that is capable of transferring loads in the wing span direction due to the hinged joint. Further, the hinge axis is inclined or angled between a wing thickness direction and a wing span direction. That means the hinge axis is neither parallel to the wing thickness direction, nor parallel to the wing span direction. The hinge axis might be perpendicular to the wing chord direction, i.e., might extend in the plane spanned by the wing thickness direction and the wing span direction. However, the hinge axis might also be inclined to the wing chord direction, i.e., might be inclined between the plane spanned by the wing thickness direction and the wing span direction, and the wing chord direction, so that the hinge axis is neither perpendicular nor parallel to the wing chord direction.

By such a linkage kinematics where the single hinge axis of the second link element is inclined between the wing thickness direction and the wing span direction, an optimized path of movement of the third joint and, thus, the entire slat with respect to the main wing is obtained, while at the same time the connection assembly, in particular the actuators, joints and link elements, are formed to better resist and transfer the occurring air-loads on the slat, which in turn allows for a construction with a minimum weight. Also, the connection assembly requires only a minimum space.

According to a preferred embodiment, the third joint is formed as a spherical joint or as a universal joint allowing rotation, in particular pivoting, about more than one axis of rotation, while the fourth joint is formed as a hinged joint allowing rotation, in particular pivoting, only about a single hinge axis. In such a way, the hinged joint is mounted to the main wing and the spherical or universal joint is mounted to the slat. However, it is also possible that the hinged joint is mounted to the slat and the spherical or universal joint is mounted to the main wing.

According to another preferred embodiment, the hinge axis is inclined between the wing thickness direction and the wing span direction by an angle of between 0° and 60°, preferably between 5° and 50°, further preferably between 10° and 45°, further preferably between 20° and 30°, measured from the wing thickness direction to the wing span direction in the plane spanned by the wing thickness direction and the wing span direction. By such an angular arrangement of the hinge axis the size and weight of the connection assembly can be minimized while the path of movement of the slat is optimized.

According to yet another preferred embodiment, the second link element is formed as an A-link having two separate elongate, preferably rod shaped, legs, namely a first leg and a second leg, that are rigidly joined together at the first element end, and that are spaced apart at the second element end. Preferably, the first leg and the second leg might be connected via a support strut providing additional support and integrity between the first and second legs. The fourth joint comprises a first joint portion at the first leg and a second joint portion at the second leg. The hinge axis corresponds to a straight line connecting the first joint portion and the second joint portion. The joining or spreading apart of the two legs might be at some point between the first and second element ends, i.e. either near the first element end or near the second element end or somewhere near the center between the first and second element ends. The first and/or second joint portions either might be formed as hinged joints, or might be formed as universal or spherical joints in order to avoid constraining forces. By such a second link element formed as an A-link, a high strength hinged joint is formed that can reliably hold and guide the slat along its path of movement.

According to yet another preferred embodiment, the first joint and/or the third joint is mounted directly to the slat. In such a way, no further structural elements connecting the first and second link elements to the slat, are required.

Alternatively, it is preferred that the first joint is connected to the slat via a first connection element that is fixedly, in particular rigidly, mounted to the slat, and/or that the third joint is connected to the slat via a second connection element that is fixedly, in particular rigidly, mounted to the slat. By such first and/or second connection elements the path of movement of the slat can be adjusted as desired.

In particular, it is preferred that the first connection element is formed as a first bar and/or the second connection element is formed as a second bar. The first bar and the second bar represent simple and lightweight construction elements for connecting the first joint and the third joint to the slat in a spaced manner, so that a desired path of movement of the slat can be defined.

According to a preferred embodiment, the first joint and the third joint are arranged such that they are spaced apart in the wing thickness direction. Preferably, the first joint is arranged above the third joint. In such a way, a couple of forces can be introduced into the slat by the first and second link elements in order to hold the slat against a corresponding moment introduced by the air-load.

According to another preferred embodiment, the first joint and the third joint are arranged in the same position with respect to the wing span direction. In such a way, it is provided that no twisting moment is introduced into the slat by the first joint and the third joint. However, it is also possible that the first joint and the third joint are spaced apart in the wing span direction.

According to yet another preferred embodiment, the second joint and the fourth joint are spaced apart in the wing span direction. In such a way, the first link element and the second link element do not interfere with one another. However, it is also possible that the second joint and the fourth joint are arranged in the same position with respect to the wing span direction.

According to another preferred embodiment, the second joint and the fourth joint are mounted to a front spar of the main wing, without penetrating the front spar. The connection assembly according to the invention can be constructed in a compact manner, so that it fits entirely in the part of the main wing in front of the front spar, thereby providing that the front spar does not need to be penetrated and no track can is necessary.

In yet another preferred embodiment, the connection assembly further comprises a drive unit for initiating movement of the slat relative to the main wing between the retracted and the extended position.

In particular, it is preferred that the drive unit comprises a rotary actuator driving the first link element about the second joint and/or driving the second link element about the fourth joint. In such a way, the first link element and/or the second link element is formed as rotary drive arm which represents a simple, effective and space saving drive concept.

Alternatively or additionally, it is preferred that the drive unit comprises a driven coupling bar coupling the slat to the main wing in a position spaced apart from the first link element and/or from the second link element in the wing span direction. Preferably, the coupling bar is rotatably coupled to the slat at its first end and is connected to or engaged by a linear actuator that is mounted, preferably rotatably mounted, to the main wing. The linear actuator can be, for example, in the form of a drive pinion, a hydraulic cylinder or an electromagnetic linear motor. Alternatively, the coupling bar is rotatably coupled to the slat at its first end and is rotatably connected to a rotary drive arm at its opposite second end, wherein the drive arm is rotatably driven mounted to the main wing. In such a way, the drive unit does not need to be arranged in the same wing span position as the first link element and/or the second link element, thereby allowing for a more compact and space saving design of the first and second link elements.

According to another preferred embodiment of the present invention, the connection assembly is a first connection assembly. Further, a second connection assembly is provided connecting the slat to the main wing in a position spaced apart from the first connection assembly in the wing span direction. Preferably, the second connection assembly is formed as the first connection assembly, i.e., including the same features as the first connection assembly, in particular, a first link element and a second link element connected to the slat and to the main wing, as described before in connection with any of the preceding embodiments. In such a way, the slat is held to the main wing by at least two connection assemblies which are spaced from one another and which are formed in the same way, thereby allowing for a more compact design of both connection assemblies. Alternatively, it might also be preferred that the second connection assembly is formed differently from the first connection assembly.

A further aspect of the present invention relates to a connection assembly for moveably connecting a slat to a main wing for an aircraft, as described before in connection with the wing for an aircraft. The connection assembly comprises a first link element which has a first link end and an opposite second link end. The first link end is configured to be rotatably mounted to the slat via a first joint. The second link end is configured to be rotatably mounted to the main wing via a second joint. The connection assembly further comprises a second link element which has a first element end and a second element end. The first element end is configured to be rotatably mounted to the slat via a third joint. The second element end is configured to be rotatably mounted to the main wing via a fourth joint. The first joint and the second joint are formed as spherical joints or as universal joints, allowing rotation about more than one axis of rotation. One of the third joint and the fourth joint is formed as a spherical joint or as a universal joint allowing rotation about more than one axis of rotation, while the other of the fourth joint and the third joint is formed as a hinged joint allowing rotation only about a single hinge axis. The hinge axis is inclined between a wing thickness direction and a wing span direction.

The features, effects and advantages of the connection assembly as described further above in connection with the wing for an aircraft, also apply to the present connection assembly.

BRIEF DESCRIPTION OF THE DRAWINGS

Preferred embodiments of the present invention are described hereinafter in more detail in connection with a drawing. The drawing shows in FIG. 1, a schematic side view of a wing for an aircraft according to a first embodiment of the invention, FIG. 2, a top view of the wing of FIG. 1, FIG. 3, a front view of the wing of FIG. 1, FIG. 4, a schematic perspective view of a wing according to a second embodiment, FIG. 5, a top view of the wing of FIG. 4, FIG. 6, a perspective view of the wing of FIG. 4, with a slat in the retracted position, FIG. 7, a top view of the wing of FIG. 6, FIG. 8, a perspective view of the wing of FIG. 4, with the slat in a partly extended position, FIG. 9, a top view of the wing of FIG. 8, FIG. 10, a perspective view of the wing of FIG. 4, with the slat in a fully extended position, FIG. 11, a top view of the wing of FIG. 10, FIG. 12, a schematic side view of a drive unit to be employed in the wing of FIGS. 4 to 11, including a linear actuator in the form of a hydraulic cylinder, FIG. 13, a schematic side view of an alternative drive unit to be employed in the wing of FIGS. 4 to 11, including a linear actuator in the form of a drive pinion, FIG. 14, a schematic side view of a drive unit to be employed in the wing of FIGS. 4 to 11, including a rotary drive arm, and FIG. 15, a schematic top view of an embodiment of the wing according to the invention, wherein the slat is connected to the main wing by a first connection assembly and a second connection assembly.

DETAILED DESCRIPTION OF THE PREFERRED EMBODIMENTS

Figure 1:
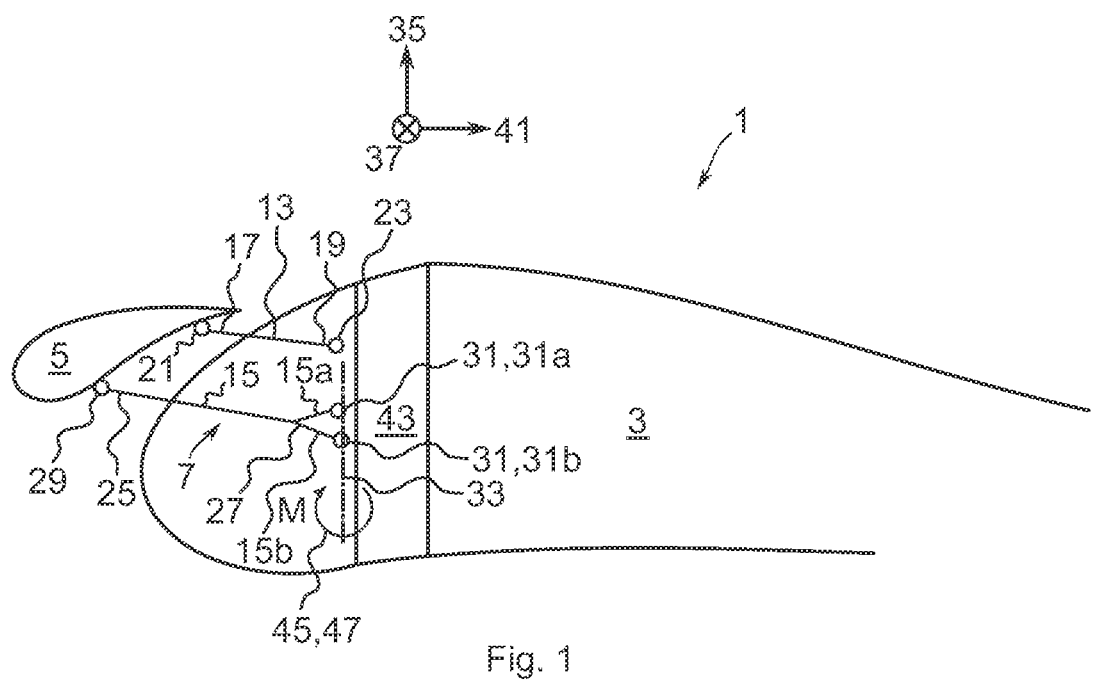
Figure 2:
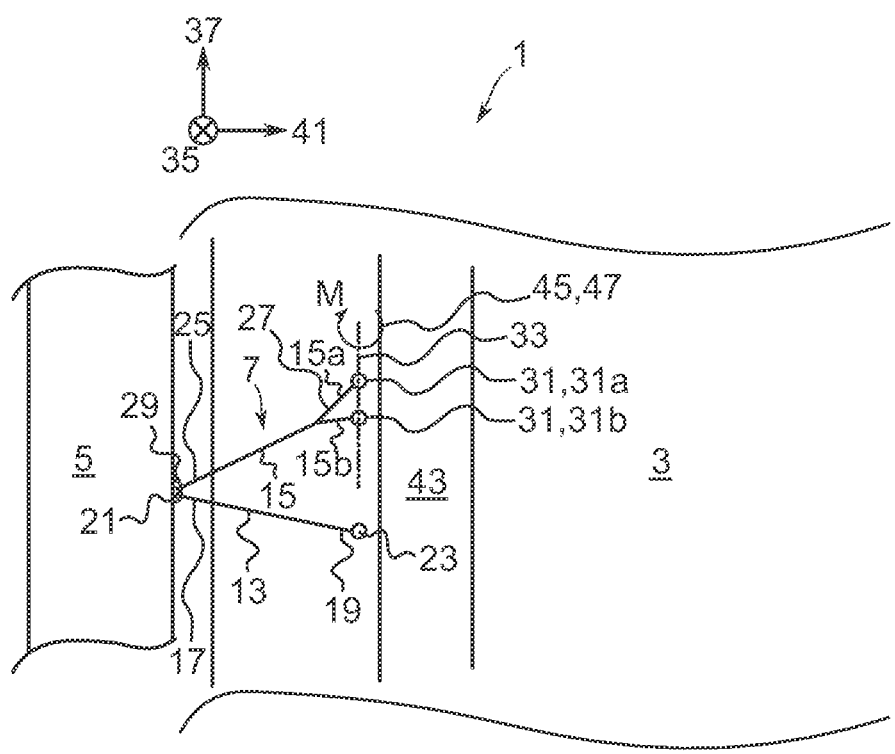
Figure 3:
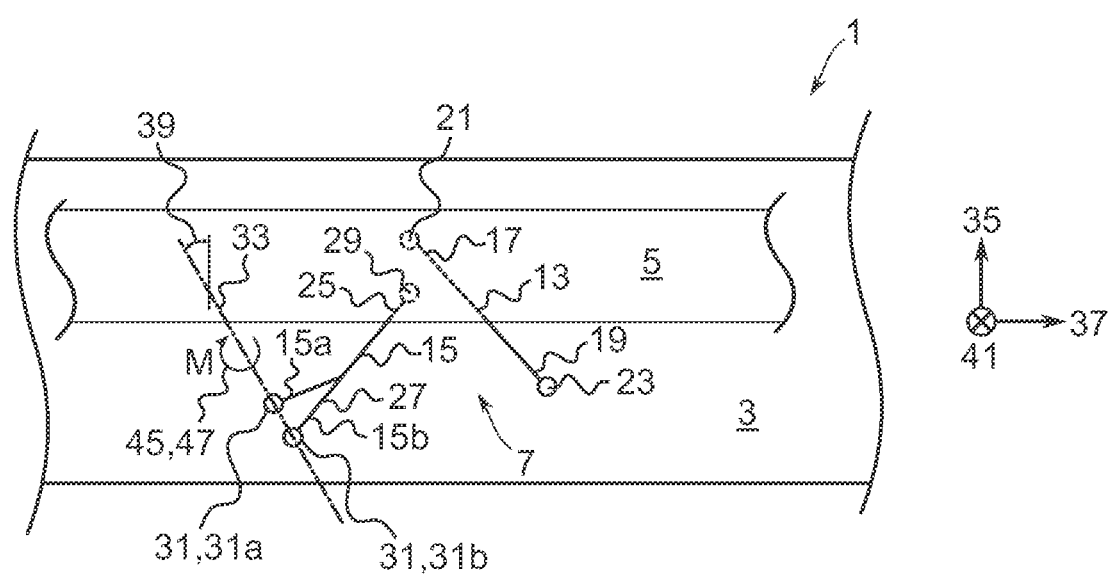
Figure 4:
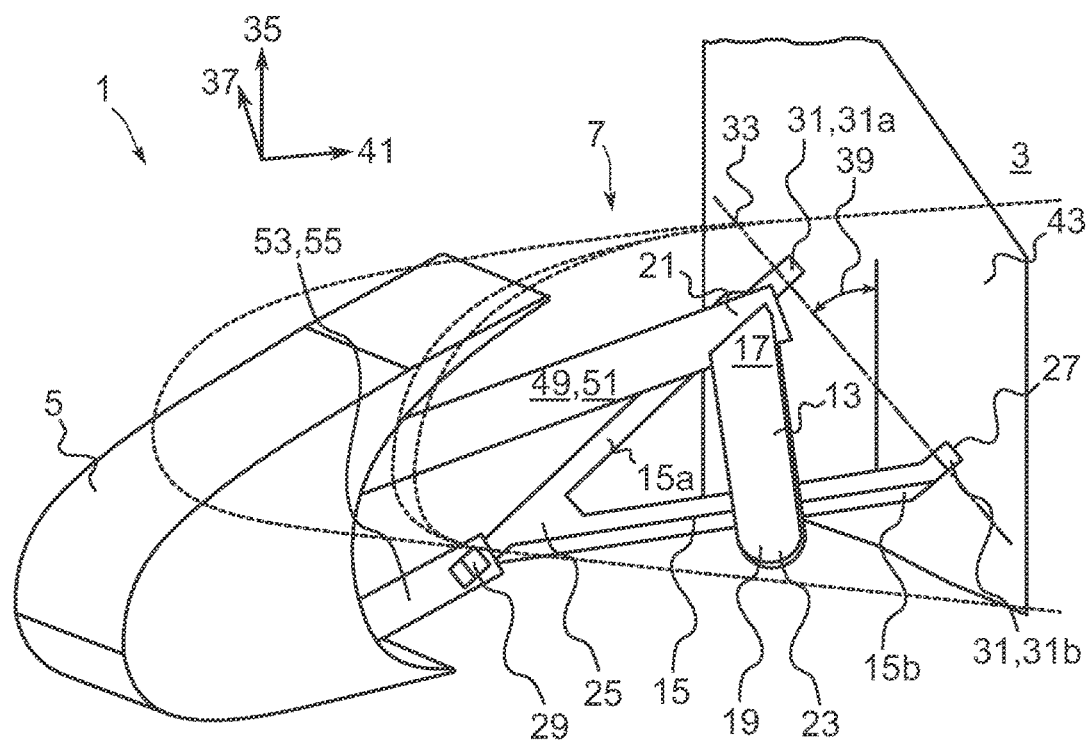
Figure 5:
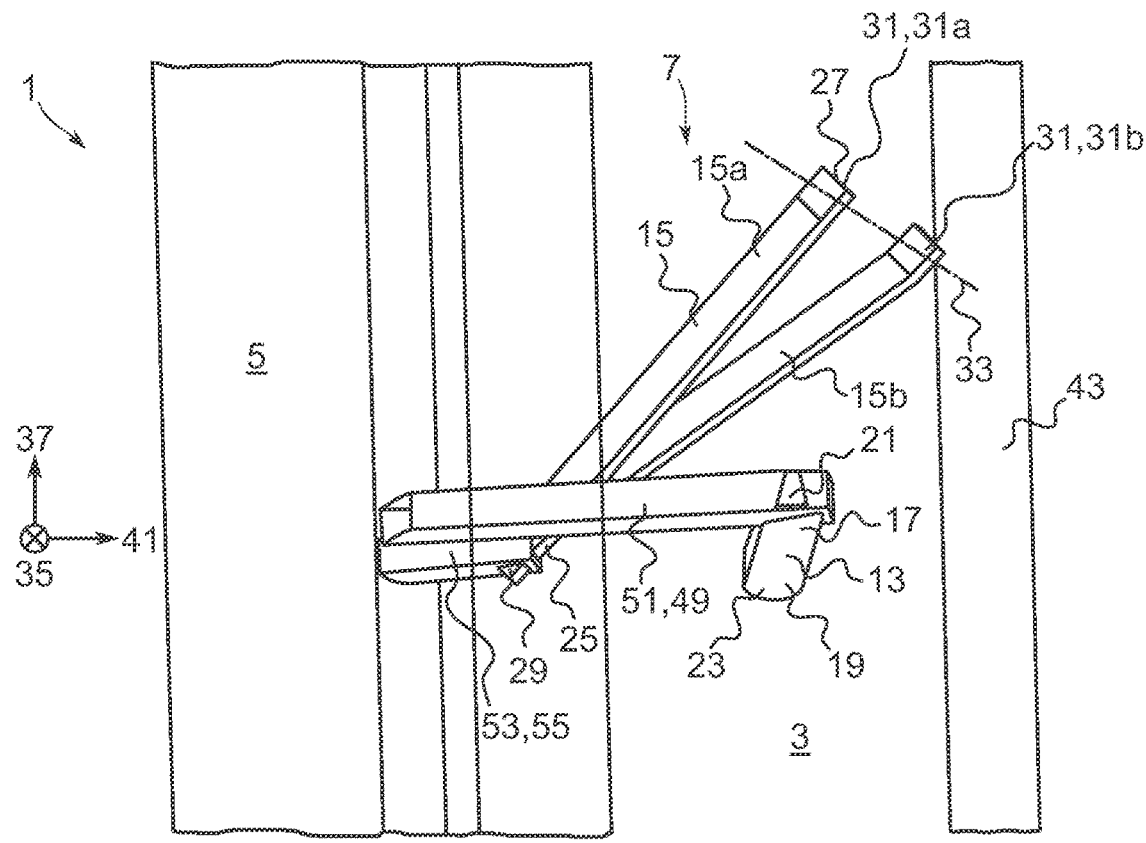

In FIGS. 1 to 3, a first embodiment of a wing 1 for an aircraft according to the present invention is shown. The wing 1 comprises a main wing 3, a slat 5 and a connection assembly 7 for movably connecting the slat 5 to the main wing 3, such that the slat 5 can be moved relative to the main wing 3 between a retracted position 9 and extended positions 11a, 11b.

The connection assembly 7 comprises a first link element 13 and a second link element 15. The first link element 13 has a first link end 17 and an opposite second link end 19. The first link end 17 is rotatably mounted to the slat 5 via a first joint 21. The second link end 19 is rotatably mounted to the main wing 3 via a second joint 23. The second link element 15 has a first element end 25 and an opposite second element end 27. The first element end 25 is rotatably mounted to the slat 5 via a third joint 29. The second element end 27 is rotatably mounted to the main wing 3 via a fourth joint 31.

The first joint 21, the second joint 23 and the third joint 29 are formed as spherical joints allowing rotation about more than one axis of rotation. The fourth joint 31 is formed as a hinged joint allowing rotation only about a single hinge axis 33. The hinge axis 33 is inclined between a wing thickness direction 35 and a wing span direction 37, as indicated in FIG. 3. In particular, the hinge axis 33 is inclined between the wing thickness direction 35 and the wing span direction 37 by an angle 39 of between 20 and 30 degrees, measured from the wing thickness direction 35 to the wing span direction 37. The hinge axis 33 is also inclined between a plane spanned by the wing thickness direction 35 and the wing span direction 37, and a wing chord direction 41.

The second link element 15 is formed as an A-link having two separate legs 15a, 15b that are rigidly joined together at the first element end 25 and that are spaced apart at the second element end 27. The fourth joint 31 comprises a first joint portion 31a at the first leg 15a and a second joint portion 31b at the second leg 15b. The hinge axis 33 corresponds to a straight line connecting first and second joint portions 31a, 31b.

The first joint 21 and the third joint 29 are spaced apart in the wing thickness direction 35, wherein the first joint 21 is arranged above the third joint 29. The first joint 21 and the third joint 29 are arranged in the same position with respect to the wing span direction 37. The second joint 23 and the fourth joint 31 are spaced apart in the wing span direction 37. The second joint 23 and the fourth joint 31 are mounted to a front spar 43 of the main wing 3. In the first embodiment, the first joint 21 and the third joint 29 are mounted directly to the slat 5.

The connection assembly comprises a drive unit 45 for initiating movement of the slat 5 between the retracted position 9 and the extended positions 11a, 11b. In the first embodiment, the drive unit 45 comprises a rotary actuator 47 driving the second link element 15 about the fourth joint 31.

FIGS. 4 to 11 show a second embodiment of the wing 1 for an aircraft according to the invention, which differs from the first embodiment shown in FIGS. 1 to 3 by the first joint 21 and the third joint 29 not being mounted to the slat 5 directly. Instead, the first joint 21 is connected to the slat 5 via a first connection element 49 in the form of a first bar 51 that is fixedly mounted to the slat 5. Further, the third joint 29 is connected to the slat 5 via a second connection element 53 in the form of a second bar 55 that is fixedly mounted to the slat 5. The second embodiment of the wing 1 further differs from the first embodiment by the hinge axis 33 being inclined also in the wing chord direction 41, i.e., between the wing chord direction 41 and a plane spanned by the wing span direction 37 and the wing thickness direction 35, as indicated, e.g., in FIG. 5.

Figure 6:
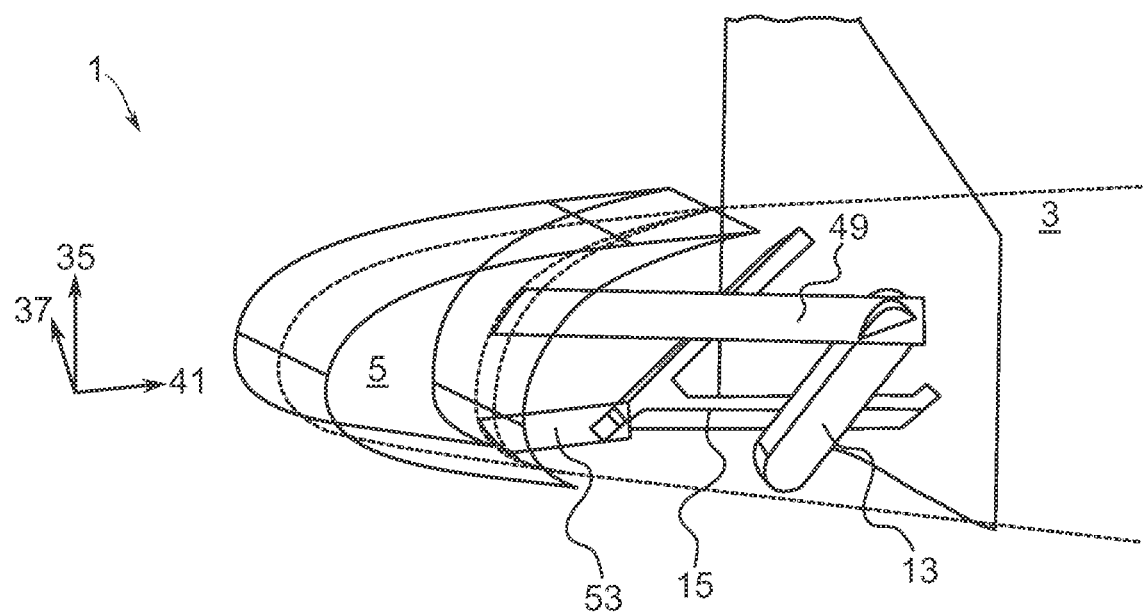
Figure 7:
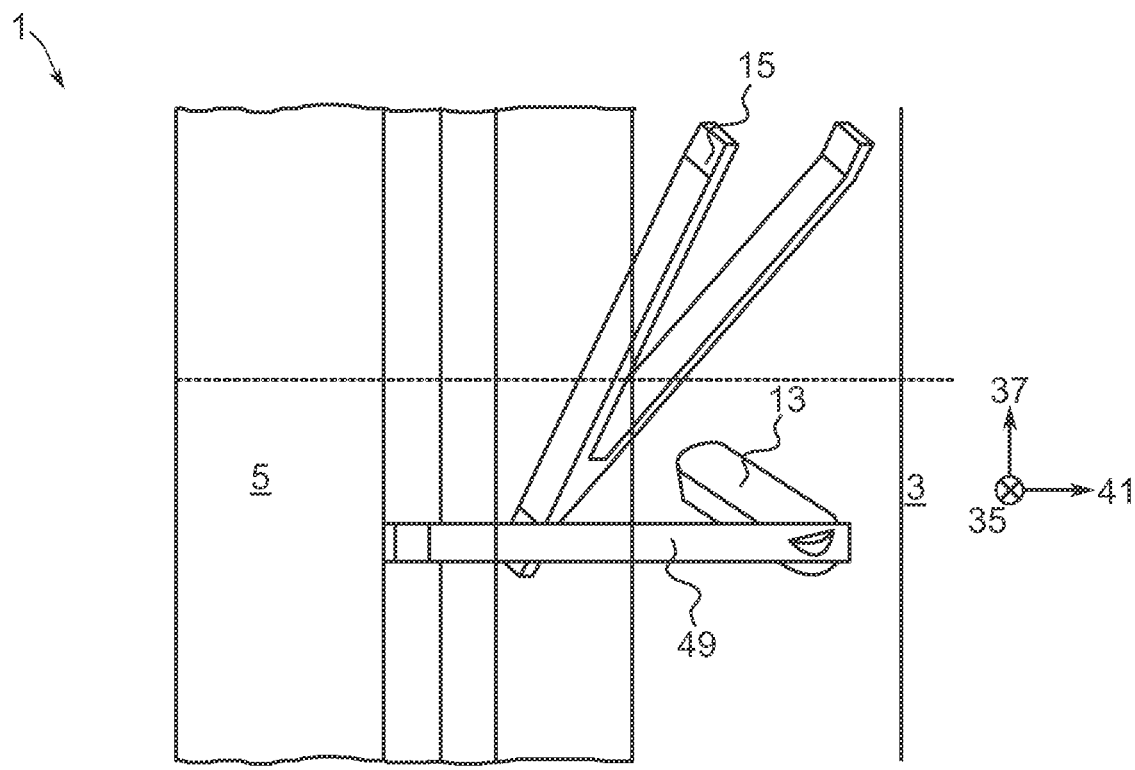
Figure 8:
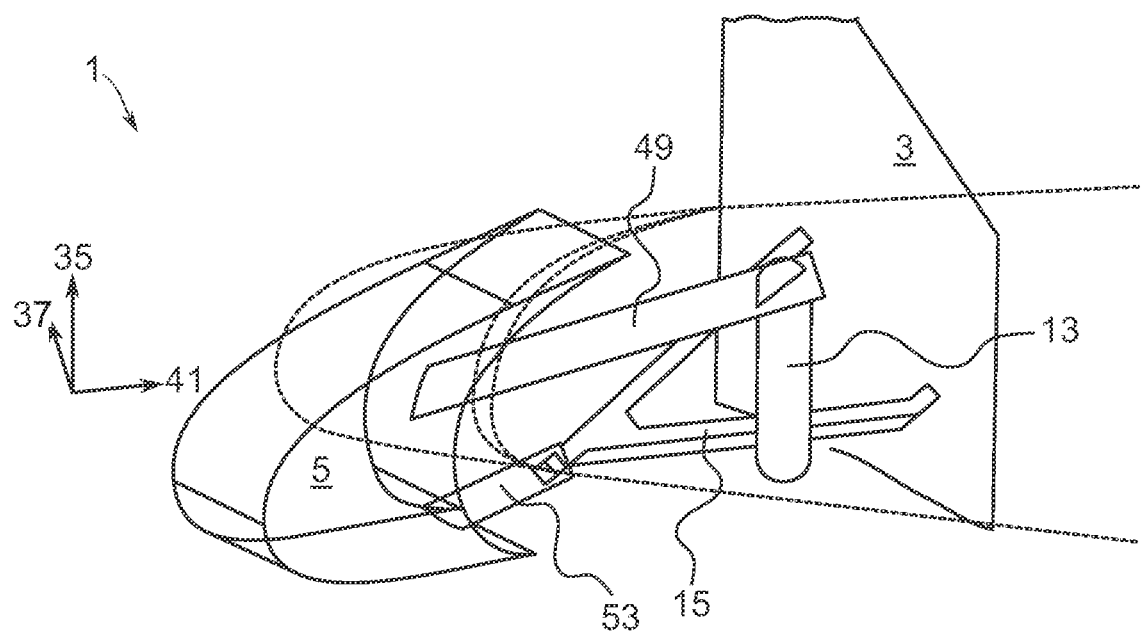
Figure 9:
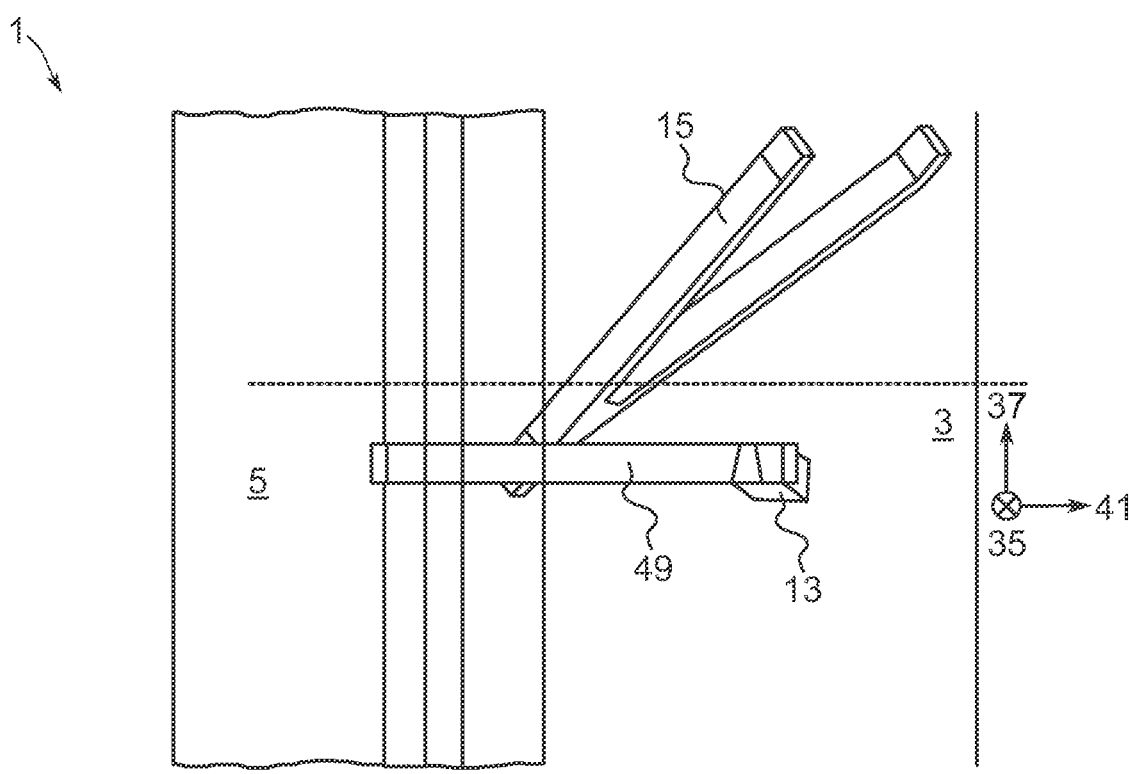
Figure 10:
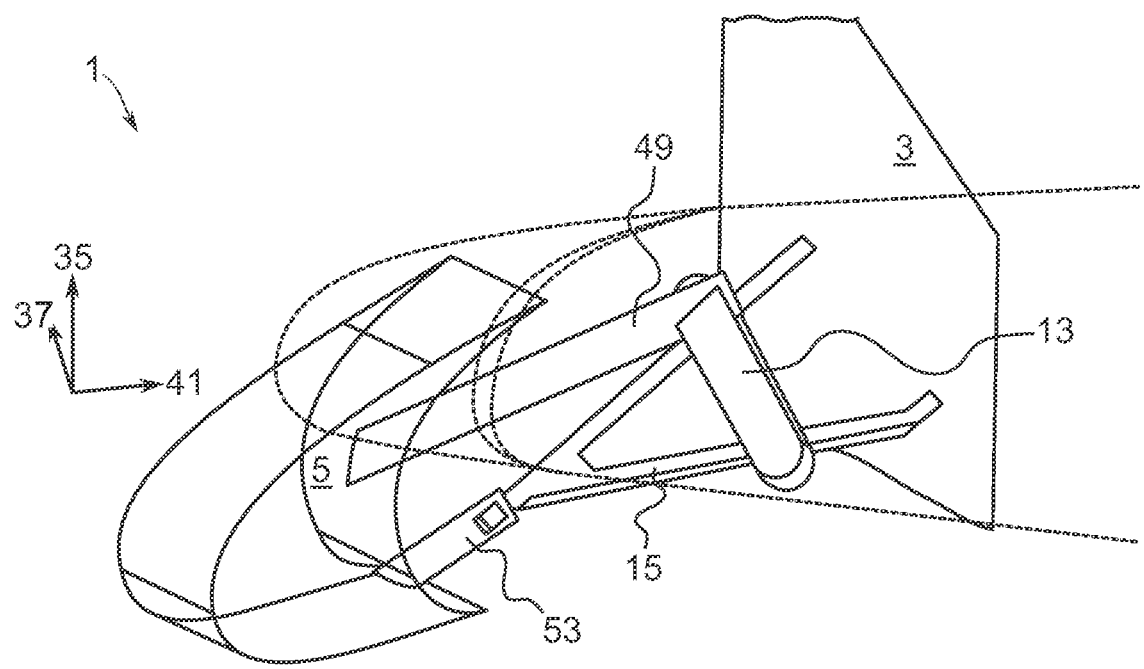
Figure 11:
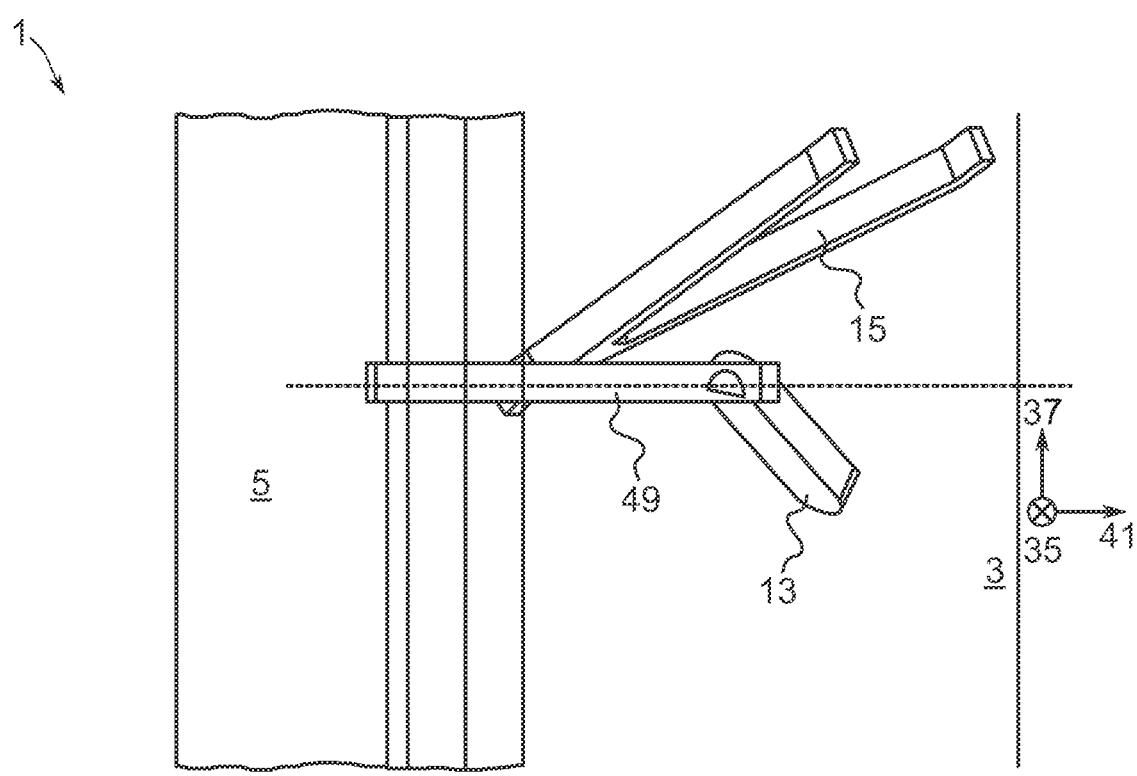

FIGS. 6 to 11 show the movement of the slat 5 between the retracted position 9 and the extended positions 11a, 11b, where FIGS. 6 and 7 show the slat 5 in the retracted position 9, FIGS. 8 and 9 show the slat 5 in a partly extended position 11a, and FIGS. 10 and 11 show the slat 5 in a fully extended position 11b. As illustrated in FIGS. 6 to 11, when the slat 5 is moved from the retracted position 9 to the partly extended position 11a and further to the fully extended position 11b, the first link element 13 pivots about the second joint 23 in the wing span direction 37 and in the wing chord direction 41, so that the first joint 21 together with the slat 5 moves in the wing chord direction 41, in the wing span direction 37, and also in the wing thickness direction 35. At the same time, the second link element 15 pivots about the hinge axis 33 that is inclined between the wing span direction 37, the wing thickness direction 35 and the wing chord direction 41, so that the third joint 29 together with the slat 5 moves in the wing chord direction 41, in the wing span direction 37 and also in the wing thickness direction 35.

Figure 12:
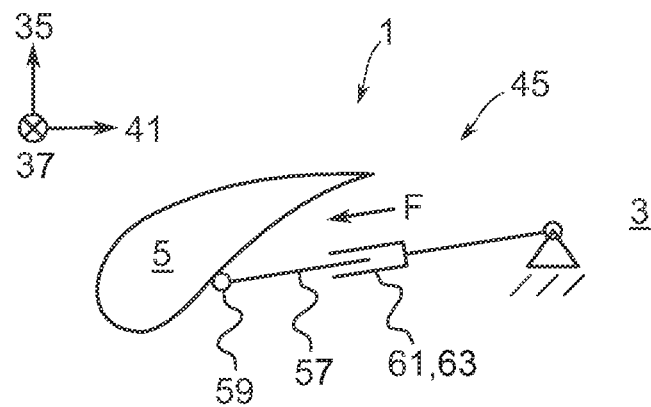
Figure 13:
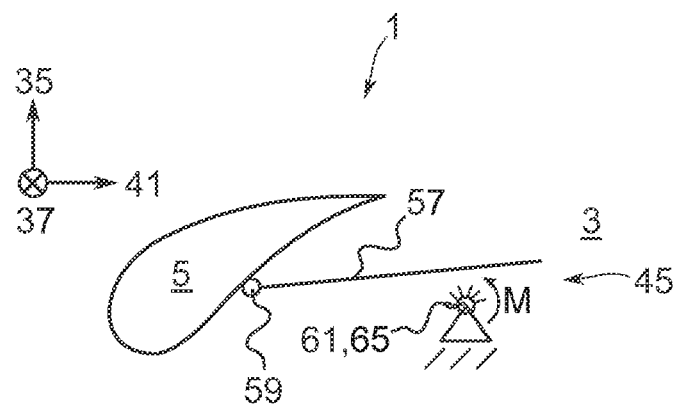
Figure 14:
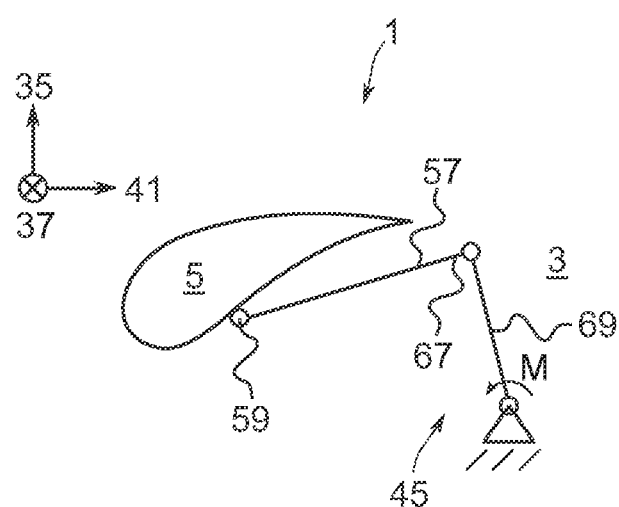

The second embodiment shown in FIGS. 6 to 11 further differs from the first embodiment shown in FIGS. 1 to 3 by the drive unit 45 comprising a driven coupling bar 57 coupling the slat 5 to the main wing 3 in a position spaced apart from the first link element 13 and the second link element 15 in the wing span direction 37. FIGS. 12 to 14 show three options how the driven coupling bar 57 might be formed and arranged, in a cross sectional view across the wing span direction 37. As shown in FIG. 12, the coupling bar 57 might be rotatably coupled to the slat 5 at its first end 59 and might be connected or engaged to a linear actuator 61 that is mounted to the main wing 3. FIG. 12 shows an option where the linear actuator 61 is formed as a hydraulic cylinder 63, while FIG. 13 shows another option where the linear actuator 61 is formed as a driven pinion 65. Alternatively, as shown in FIG. 14, the coupling bar 57 might also be rotatably coupled to the slat 5 at its first end 59, and at its opposite second end 67 rotatably connected to a rotary drive arm 69 that is rotatingly mounted to the main wing 3.

Figure 15:
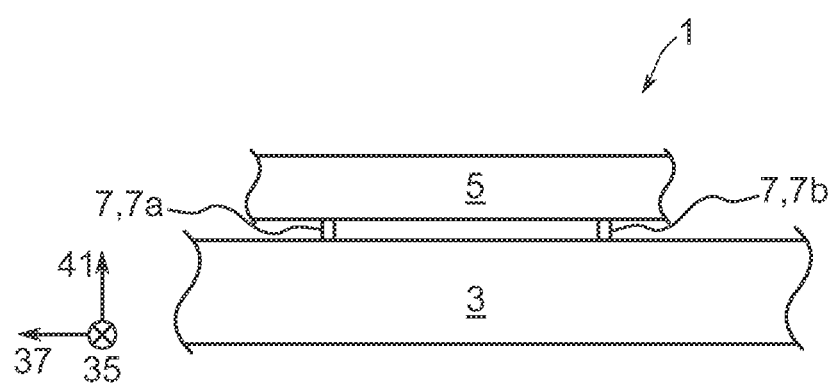

All described embodiments have in common that the connection assembly 7 is a first connection assembly 7a and that a second connection assembly 7b is provided connecting the slat 5 to the main wing 3 in a position spaced apart from the first connection element 7a in the wing span direction 37, as illustrated in FIG. 15. In the preferred embodiments shown, the second connection assembly 7b is formed as the first connection assembly 7a, although it might also be formed differently from the first connection assembly 7a.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
a main wing,
a slat, and
a connection assembly for movably connecting the slat to the main wing, such that the slat can be moved between a retracted position and at least one extended position, wherein the connection assembly comprises
a first link element which has a first link end and an opposite second link end, wherein the first link end is rotatably mounted to the slat via a first joint, and wherein the second link end is rotatably mounted to the main wing via a second joint, and
a second link element which has a first element end and an opposite second element end, wherein the first element end is rotatably mounted to the slat via a third joint spaced apart from the first joint, and wherein the second element end is rotatably mounted to the main wing via a fourth joint spaced apart from the second joint,
the first joint and the second joint being formed as spherical joints or as universal joints, allowing rotation about more than one axis of rotation,
one of the third joint and the fourth joint being formed as a spherical joint or as a universal joint allowing rotation about more than one axis of rotation, the other of the third joint and the fourth joint being formed as a hinged joint allowing rotation only about a single hinge axis, and
the hinge axis being inclined between a wing thickness direction and a wing span direction.

2. The wing according to claim 1, wherein the third joint is formed as a spherical joint or as a universal joint allowing rotation about more than one axis of rotation, while the fourth joint is formed as a hinged joint allowing rotation only about a single hinge axis.

3. The wing according to claim 1, wherein the hinge axis is inclined between the wing thickness direction and the wing span direction by an angle of between 0° and 60°, measured from the wing thickness direction to the wing span direction.

4. The wing according to claim 1, wherein the hinge axis is inclined between the wing thickness direction and the wing span direction by an angle of between 10° and 45°, measured from the wing thickness direction to the wing span direction.

5. The wing according to claim 1, wherein the hinge axis is inclined between the wing thickness direction and the wing span direction by an angle of between 20° and 30°, measured from the wing thickness direction to the wing span direction.

6. The wing according to claim 2, wherein the second link element is formed as an A-link having two separate legs that are rigidly joined together at the first element end and that are spaced apart at the second element end, wherein the fourth joint comprises a first joint portion at the first leg and a second joint portion at the second leg, and wherein the hinge axis corresponds to a straight line connecting first and second joint portions.

7. The wing according to claim 1, wherein at least one of the first joint or the third joint is mounted directly to the slat.

8. The wing according to claim 1, wherein at least one of
the first joint is connected to the slat via a first connection element that is fixedly mounted to the slat, or
the third joint is connected to the slat via a second connection element that is fixedly mounted to the slat.

9. The wing according to claim 8, wherein at least one of the first connection element is formed as a first bar or the second connection element is formed as a second bar.

10. The wing according to claim 1, wherein the first joint and the third joint are spaced apart in the wing thickness direction.

11. The wing according to claim 1, wherein the first joint and the third joint are arranged in the same position with respect to the wing span direction.

12. The wing according to claim 1, wherein the second joint and the fourth joint are spaced apart in the wing span direction.

13. The wing according to claim 1, wherein the second joint and the fourth joint are mounted to a front spar of the main wing.

14. The wing according to claim 1, wherein the connection assembly further comprises a drive unit for initiating movement of the slat between the retracted position and the extended position.

15. The wing according to claim 14, wherein the drive unit comprises a rotary actuator at least one of driving the first link element about the second joint or driving the second link element about the fourth joint.

16. The wing according to claim 14, wherein the drive unit comprises a driven coupling bar coupling the slat to the main wing in a position spaced apart from at least one of the first link element or from the second link element in the wing span direction, wherein the coupling bar is rotatably coupled to the slat and is either connected to a linear actuator that is mounted to the main wing, or rotatably connected to a rotary drive arm that is mounted to the main wing.

17. A connection assembly for movably connecting a slat to a main wing for an aircraft, the connection assembly comprising a first link element which has a first link end and an opposite second link end, wherein the first link end is configured to be rotatably mounted to the slat via a first joint, and wherein the second link end is configured to be rotatably mounted to the main wing via a second joint, and a second link element which has a first element end and a second element end, wherein the first element end is configured to be rotatably mounted to the slat via a third joint spaced apart from the first joint, and wherein the second element end is configured to be rotatably mounted to the main wing via a fourth joint spaced apart from the second joint, wherein, the first joint and the second joint are formed as spherical joints or as universal joints, allowing rotation about more than one axis of rotation, one of the third joint and the fourth joint is formed as a spherical joint or as a universal joint allowing rotation about more than one axis of rotation, while the other of the third joint and the fourth joint is formed as a hinged joint allowing rotation only about a single hinge axis, and the hinge axis is inclined between a wing thickness direction and a wing span direction.

* * * * *